United States Patent
Soldi

(10) Patent No.: US 9,280,426 B2
(45) Date of Patent: Mar. 8, 2016

(54) SYSTEM AND METHOD FOR SERVER REDUNDANCY

(71) Applicant: Solar Turbines Inc., San Diego, CA (US)

(72) Inventor: Andrea Soldi, Maccagno (IT)

(73) Assignee: Solar Turbines Incorporated, San Diego, CA (US)

( * ) Notice: Subject to any disclaimer, the term of this patent is extended or adjusted under 35 U.S.C. 154(b) by 377 days.

(21) Appl. No.: 13/949,860

(22) Filed: Jul. 24, 2013

(65) Prior Publication Data

US 2015/0032232 A1    Jan. 29, 2015

(51) Int. Cl.
    *G05B 19/048*      (2006.01)
    *G06F 11/16*      (2006.01)

(52) U.S. Cl.
    CPC .............. *G06F 11/16* (2013.01); *G05B 19/048* (2013.01)

(58) Field of Classification Search
    CPC ........ G05B 19/048; G05B 9/03; G06F 11/00; G06F 11/07; G06F 11/08; G06F 11/14; G06F 11/16
    USPC .............................. 700/79, 287; 709/203, 219
    See application file for complete search history.

(56) References Cited

U.S. PATENT DOCUMENTS

| | | | |
|---|---|---|---|
| 5,596,706 A | 1/1997 | Shimazaki et al. | |
| 5,996,086 A | 11/1999 | Delaney et al. | |
| 6,097,882 A * | 8/2000 | Mogul ................ | H04L 67/1008 709/201 |
| 6,134,673 A * | 10/2000 | Chrabaszcz ......... | G06F 11/1658 714/10 |
| 6,363,497 B1 * | 3/2002 | Chrabaszcz ......... | G06F 11/1658 714/13 |
| 6,519,509 B1 * | 2/2003 | Nierlich .................. | H02J 3/008 700/286 |
| 6,681,154 B2 * | 1/2004 | Nierlich .................. | H02J 3/008 323/267 |
| 7,080,137 B2 | 7/2006 | Brault | |
| 7,088,014 B2 * | 8/2006 | Nierlich .................. | H02J 3/008 307/38 |
| 7,421,497 B2 * | 9/2008 | Rosenbach ........... | G06F 9/5088 709/201 |
| 7,478,275 B1 * | 1/2009 | Deolasee ............. | G06F 11/1458 714/13 |
| 7,568,000 B2 * | 7/2009 | Keyes ................ | G05B 23/0264 709/200 |
| 7,571,343 B1 * | 8/2009 | Xiang ..................... | H04L 69/40 709/203 |
| 7,752,486 B2 * | 7/2010 | Satran ................. | G06F 11/2028 709/227 |
| 7,809,892 B1 * | 10/2010 | Chatterjee ........... | G06F 11/2028 711/143 |
| 7,865,556 B2 * | 1/2011 | Kadashevich ...... | G06F 11/1482 709/206 |
| 7,870,258 B2 * | 1/2011 | Sundaresan ............. | H04L 29/06 709/227 |

(Continued)

OTHER PUBLICATIONS

High Availability and Mesh Network Redundancy, Aerohive Networks, http://www.aerohive.com/solutions/technology-behind-solution/high-availability-and-mesh-network-redundancy.

(Continued)

*Primary Examiner* — Charles Kasenge
(74) *Attorney, Agent, or Firm* — James R. Smith

(57) ABSTRACT

A system is provided. The system includes a plurality of nodes. One of the plurality of nodes is designated as a server node, and the others of the plurality of nodes are designated as Human Machine Interface (HMI) client nodes. The designated server node comprises a network interface configured to communicate with a Programmable Logic Controller (PLC) either directly or through a network switch. Each of the designated HMI client nodes includes a network interface configured to communicate with the designated server node through one or more of a network switch, and another designated HMI client node. Also, the each of the designated HMI client nodes includes a failover module configured to detect a failure of the designated server node and designate a new server node from among the designated HMI client nodes based on detecting the failure of the designated server node.

12 Claims, 5 Drawing Sheets

(56) References Cited

U.S. PATENT DOCUMENTS

| | | | | |
|---|---|---|---|---|
| 8,700,760 | B2* | 4/2014 | Tham | G06F 11/2025 709/224 |
| 8,868,726 | B1* | 10/2014 | Tu | H04L 67/32 709/223 |
| 9,002,761 | B2* | 4/2015 | Montalvo | G06Q 10/06 322/38 |
| 2003/0041135 | A1* | 2/2003 | Keyes | G05B 23/0264 709/223 |
| 2004/0174071 | A1* | 9/2004 | Nierlich | H02J 3/008 307/11 |
| 2005/0268145 | A1* | 12/2005 | Hufferd | G06F 11/1443 714/2 |
| 2005/0273645 | A1* | 12/2005 | Satran | G06F 11/2033 714/4.1 |
| 2006/0212453 | A1* | 9/2006 | Eshel | G06F 11/2025 |
| 2007/0180302 | A1* | 8/2007 | Allen | G06F 11/2041 714/6.3 |
| 2008/0059639 | A1* | 3/2008 | Zhang | G06F 9/5083 709/227 |
| 2008/0201602 | A1* | 8/2008 | Agarwal | G06F 11/2097 714/4.1 |
| 2008/0209260 | A1* | 8/2008 | Vykunta | G06F 11/2097 714/6.2 |
| 2009/0077413 | A1* | 3/2009 | Dake | H04L 63/1458 714/4.1 |
| 2009/0119306 | A1* | 5/2009 | Garbow | H04L 67/1095 |
| 2010/0005336 | A1* | 1/2010 | Jordan | H04L 69/40 714/4.1 |
| 2010/0042715 | A1* | 2/2010 | Tham | G06F 11/2025 709/224 |
| 2010/0088261 | A1* | 4/2010 | Montalvo | H02J 3/14 706/15 |
| 2011/0161538 | A1 | 6/2011 | Decker | |
| 2011/0225448 | A1* | 9/2011 | Morosan | G06F 11/2028 714/4.11 |
| 2012/0065805 | A1* | 3/2012 | Montalvo | G06Q 10/06 700/297 |
| 2013/0166706 | A1* | 6/2013 | Christenson | H04L 41/0856 709/221 |
| 2013/0166707 | A1* | 6/2013 | Christenson | H04L 41/0856 709/221 |
| 2014/0115380 | A1* | 4/2014 | Morosan | G06F 11/2028 714/4.11 |

OTHER PUBLICATIONS

Wireless Mesh Network, Wikipedia, http://en.wikipedia.org/wiki/Wireless_mesh-network.

Sibur-Tumen Uses OPC Redundancy in Critical Plant Application, MatrikonOPC, https://www.matrikonopc.com/downloads/86/index.aspx.

* cited by examiner

SYSTEM AND METHOD FOR SERVER REDUNDANCY

TECHNICAL FIELD

The present disclosure relates to a centralized computing system, and more specifically to a system and method for server redundancy in the centralized computing system.

BACKGROUND

A Supervisory Control And Data Acquisition (SCADA) is a type of industrial control system (ICS) used to monitor and control industrial processes. The term SCADA refers to a centralized systems which are capable of monitoring and controlling entire sites, or complexes of systems spread out over large areas. Multiple Human Machine Interface (HMI) devices are linked to a Programmable Logic Controller (PLC) of the SCADA system. The HMI devices are configured to access the SCADA system's database and software programs, in order to provide trending, diagnostic data, and management information such as, scheduled maintenance procedures, logistic information and the like to a user at a remote location.

Known system architecture solutions require the PLC to be communicating with only one HMI device at a time. These systems therefore involve the PLC communicating with a single server HMI device. This server HMI device in turn communicates with the other client HMI devices. However, on failure of the server HMI device, the entire system may fail. Hence, the system may be susceptible to high risk of failure.

U.S. Publication Number 2011/0161538 discloses a method and system for implementing redundant master NIMs on a single bus in an industrial distributed I/O system for controlling selected I/O modules. Two master NIMs interoperate on a single bus, with one being the primary, active, master, and the second master in a secondary, standby, mode, ready to assume mastership of the system if the primary master is no longer active.

SUMMARY OF THE DISCLOSURE

In one aspect of the present disclosure, a system is provided. The system includes a plurality of nodes. One of the plurality of nodes is designated as a server node, and the others of the plurality of nodes are designated as Human Machine Interface (HMI) client nodes. The designated server node comprises a network interface configured to communicate with a Programmable Logic Controller (PLC) either directly or through a network switch. Each of the designated HMI client nodes includes a network interface configured to communicate with the designated server node through one or more of a network switch, and another designated HMI client node. Also, the each of the designated HMI client nodes includes a failover module configured to detect a failure of the designated server node and designate a new server node from among the designated HMI client nodes based on detecting the failure of the designated server node.

In another aspect, a method is provided. The method includes designating, from a plurality of nodes that are communicably coupled to each other and a Programmable Logic Controller (PLC), a single node as a designated server node. The designated server node is configured to communicate with the PLC either directly, or through a network switch. The method includes designating remaining ones of the plurality of nodes as Human Machine Interface (HMI) client nodes. The designated HMI client nodes are communicably coupled to the designated server node through a network switch. The method further includes detecting a failure of the designated server node. The method includes designating a new server node from among the designated HMI client nodes based on detecting the failure of the designated server node.

In yet another aspect, a system is provided. The system includes at least two network switches and a plurality of nodes. The at least two network switches are connected to a Programmable Logic Controller (PLC) through wired connections. The plurality of nodes are connected to one of the at least two network switches. One of the plurality of nodes is designated as a server node. The designated server node is configured to communicate with the PLC through one of the at least two network switches. Remaining ones of the plurality of nodes are designated as Human Machine Interface (HMI) client nodes. The remaining ones of the plurality of nodes are configured to communicate with the PLC through the designated server node. Each of the designated HMI client nodes includes a failover module. The failover module 201 is configured to detect a failure of the designated server node. The failover module 201 is further configured to designate a new server node from among the designated HMI client nodes based on detecting the failure of the designated server node.

Other features and aspects of this disclosure will be apparent from the following description and the accompanying drawings.

DETAILED DESCRIPTION

Figure 1:
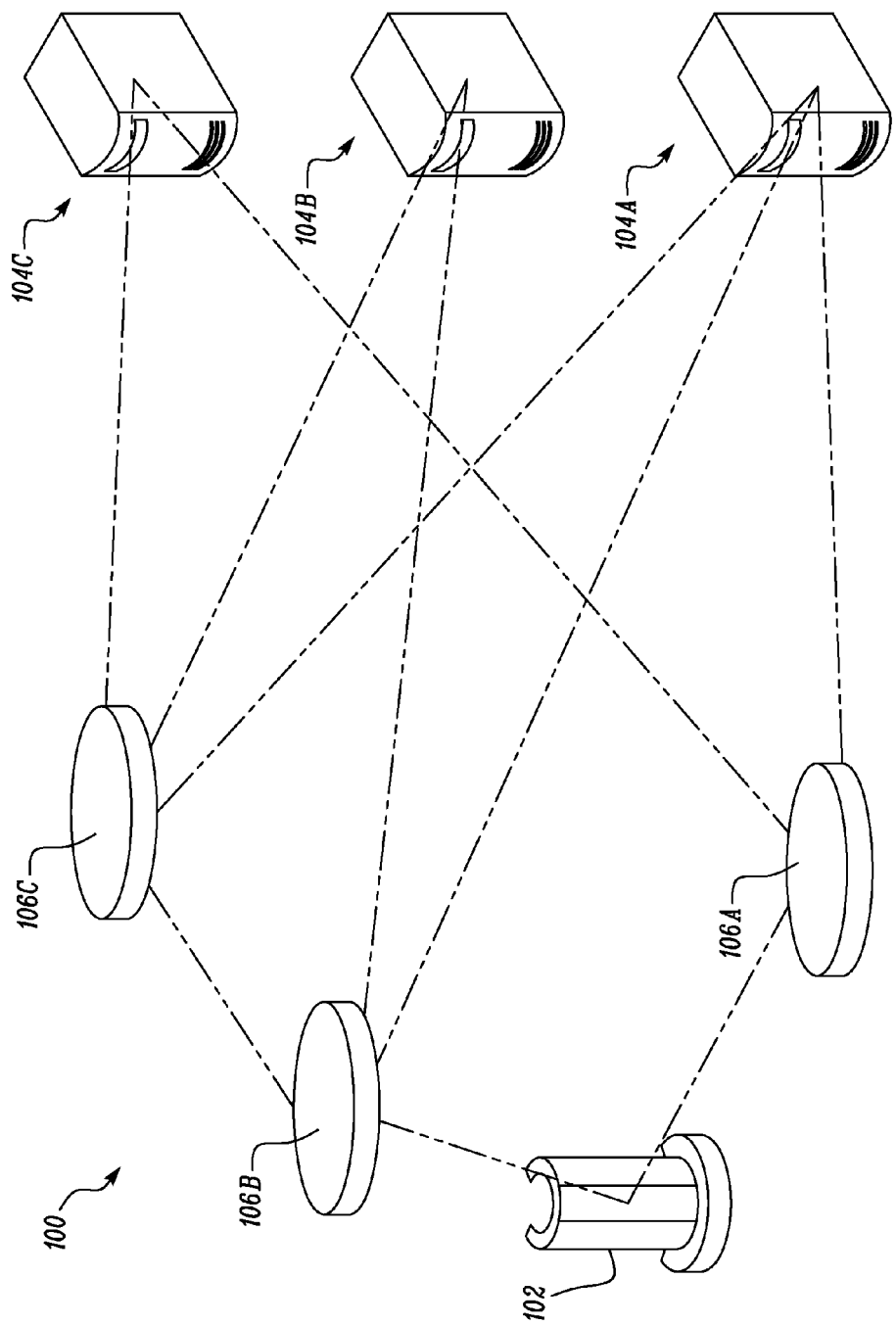
FIG. 1 is an exemplary environment including a Programmable Logic Controller (PLC) and a plurality of nodes, according to one embodiment of the present disclosure.

Wherever possible, the same reference numbers will be used throughout the drawings to refer to the same or the like components. FIG. 1 illustrates an exemplary environment 100 including a Programmable Logic Controller (PLC) 102. The term 'PLC' used herein refers to a general-purpose computer used in industrial and machine applications. The PLC 102 is capable of receiving multiple inputs, performing required processing and producing relevant outputs, as per the system requirements. The PLC 102 may operate in an environment having relatively high temperatures, electrical noise, vibrations and other environmental conditions.

In one embodiment, the PLC 102 is connected to or embedded within a turbine. Accordingly, the PLC 102 may be deployed in an industrial environment. The connections between the PLC 102 and the turbine may be wired. Alternatively, the connections may be wireless. A person of ordinary skill in the art will appreciate that the use of wired connections may provide a relatively more reliable communication path in the industrial environment having electrical noise. The PLC 102 may include at least one processor and a memory in communication with the processor. The PLC 102 is configured to receive turbine operational data associated with the turbine. The turbine operational data may include information related to the operation of the turbine such as, for example, turbine RPM, power output, rotational speed, normalization threshold data and so on. This data may either be stored within the PLC 102 or may be stored in a database extrinsic to the PLC 102. A person of ordinary skill in the art will appreciate that the data may be stored in a distributed database system. The PLC 102 may be configured to perform data acquisition and maintenance functionalities.

The system further includes a plurality of nodes 104. The plurality of nodes 104 may be deployed at a remote or local location such as a client site. More specifically, any one node 104, for example node 104A, from among the plurality of nodes 104 may be designated as a server node and other nodes, for example nodes 104B and 104C, of the plurality of nodes 104 may be designated as Human Machine Interface (HMI) client nodes. One of ordinary skill in the art will appreciate that each of the plurality of nodes 104 has the same capabilities. For example, each of the plurality of nodes 104 may have its own internal HMI services like OLE for Process Control (OPC), Modbus, visualization point, data collection and so on. The terms "designated server node" and "designated HMI client node" used herein are merely to distinctly refer to these nodes based on their connection with the PLC 102. More specifically, the designated server node 104A is in direct communication with the PLC 102, while the designated HMI client nodes 104B and 104C are in communication with the PLC 102 via the designated server node 104A. The designation of the server node 104A from among the plurality of nodes 104 may be based on a variety of factors, resulting in a reliable 1:1 connection with the PLC 102.

The illustrated embodiment depicts three nodes 104 connected to the PLC 102 via three network switches 106. The dashed lines shown in FIG. 1 are indicative of wired connections between the respective components. The wired connections may be, for example, unshielded twisted pair (UTP) cables, shielded twisted pair (STP) cables, coaxial cables, or fibre optic cables. In one embodiment, these connections may be wireless. One of ordinary skill in the art will appreciate that the accompanying figures are merely on an illustrative basis and do not limit the scope of the present disclosure.

The designated server node may be configured to communicate with the PLC 102 either directly or through the network switch 106A. The network switch 106A may include any known device, such as an Ethernet switch, that is capable of switching data via communication links established between the multiple nodes 104. It should be understood that the type of network switch 106 used will depend on the type of communication protocol followed by the nodes 104 and the PLC 102. The network switch 106 is capable of inspecting received data packets, determining a source and a destination node of each of the data packets, and forwarding the data packets to the appropriate destination node. Different models or types of the network switch 106 are known to support differing numbers of connected devices.

In one embodiment, at least two network switches 106 may be provided for establishing the connections between the PLC 102 and the plurality of nodes 104. The presence of more than one network switch 106 in the system may add redundancy to the system and provide a more robust environment against system failure.

It should be understood that the designated server node may be configured to serve as a single access point for communication between any of the designated HMI client nodes and the PLC 102. More particularly, the designated server node may be configured to transmit the turbine operational data downstream to the designated HMI client nodes. Further, in one embodiment, each of the designated HMI client nodes may be capable of communicating with the designated server node through the network switch 106, through wired links. In such an embodiment, the wired links may be in a stand-by state, until required to be in an active state. It should be noted that each of the plurality of nodes 104 may include a network interface to allow for the connection with a network switch 106 and/or any of the other nodes 104.

In another embodiment, the designated HMI client nodes may be configured to communicate with the designated server node through a relay node. The term "relay node" used herein refers to that node which serves as a local server node for the other designated HMI client nodes. For example, HMI client node 104B may act as a relay node for HMI client node 104C, connected through network switch 106C. A person of ordinary skill in the art will appreciate that each of the plurality of nodes 104 have the capability to simultaneously function as a client as well as a local server for other nodes 104. As explained above, each of the plurality of nodes 104 may have its own internal HMI services like OLE for Process Control (OPC), Modbus, visualization point, data collection and so on. The term "relay node" used herein is merely to refer to that node which serves as the local server for the other designated HMI client nodes based on the exemplary connections in the illustrated embodiments. It should be noted that this functionality of simultaneously behaving as the client and the local server is exhibited by each of the nodes 104, i.e. the designated server node, the designated HMI client node, and the relay node, without any distinction.

It should be noted that connections may be made in such a manner that each of the plurality of nodes 104 may be have at least two connections for connecting the given node 104 to distinct devices in the system. The device may be the network switch 106, or another node 104. In one embodiment, a user may perform a read operation on the turbine operational data retrieved from the PLC 102 at the designated HMI client node. In another embodiment, the user may perform a write operation on the turbine operational data at the designated HMI client node. Based on a user input received at the respective designated HMI client node, the turbine operational data may be modified.

Accordingly, each of the designated HMI client nodes may include various components such as an input unit and an output unit in order to accept the user input and display the data to the user. The output unit may include, for example, a display device like a monitor or screen. The input unit may include a keyboard, a control panel and so on. It should be noted that the turbine operational data made available at any of the designated HMI client nodes is based on a real time request. The turbine operational data is not cached at any of the plurality of nodes 104. The turbine operational data may be retrieved by any of the designated HMI client nodes on demand from the PLC 102, thereby maintaining data consistency and reliability. Hence the turbine operational data transmitted from the designated server node to the designated HMI client nodes may be reliable and valid irrespective of the performance of the write operation on the turbine operational data.

Further, control information may be transmitted upstream from the respective designated HMI client node to the designated server node. The control information may include modified turbine operational data and/or data input by the user at the designated HMI client node. The designated server node may further transmit the control information to the PLC 102. In one embodiment, working of the turbine may be controlled by the PLC 102 based on the control information received from the designated server node.

Figure 2:
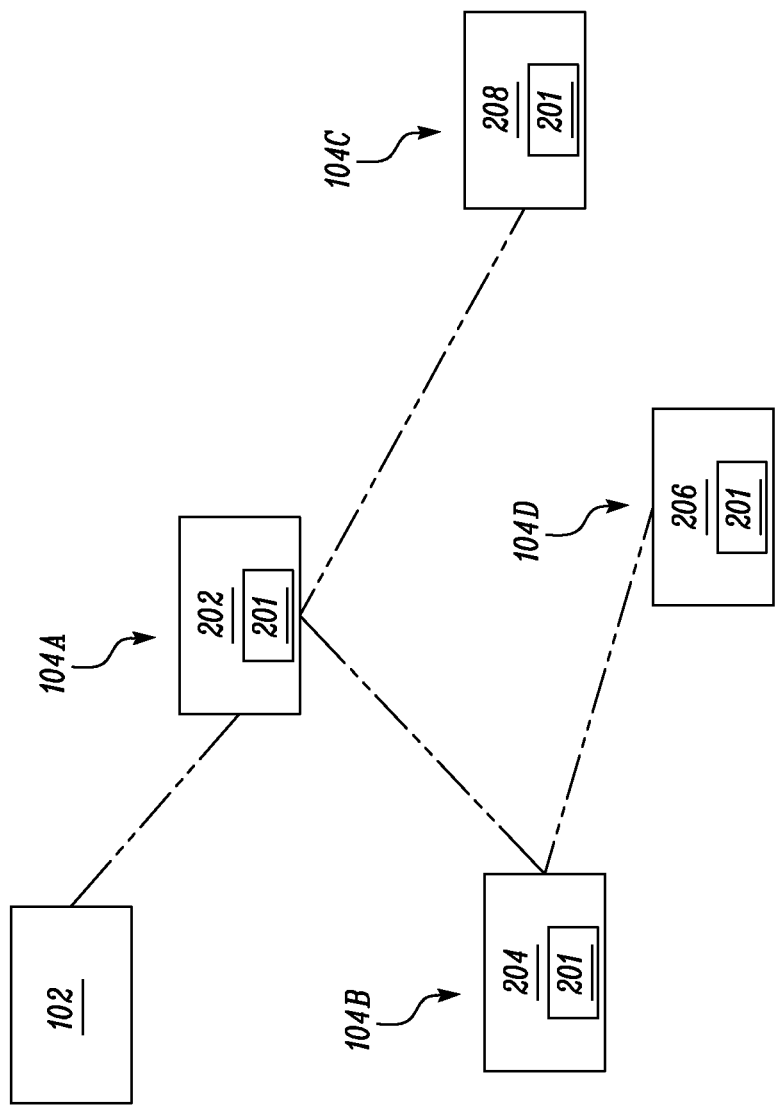
FIGS. 2 and 3 are block diagrams depicting different communication links between a designated server node and multiple designated Human Machine Interface (HMI) client nodes, according to various embodiments of the present disclosure.
Figure 3:
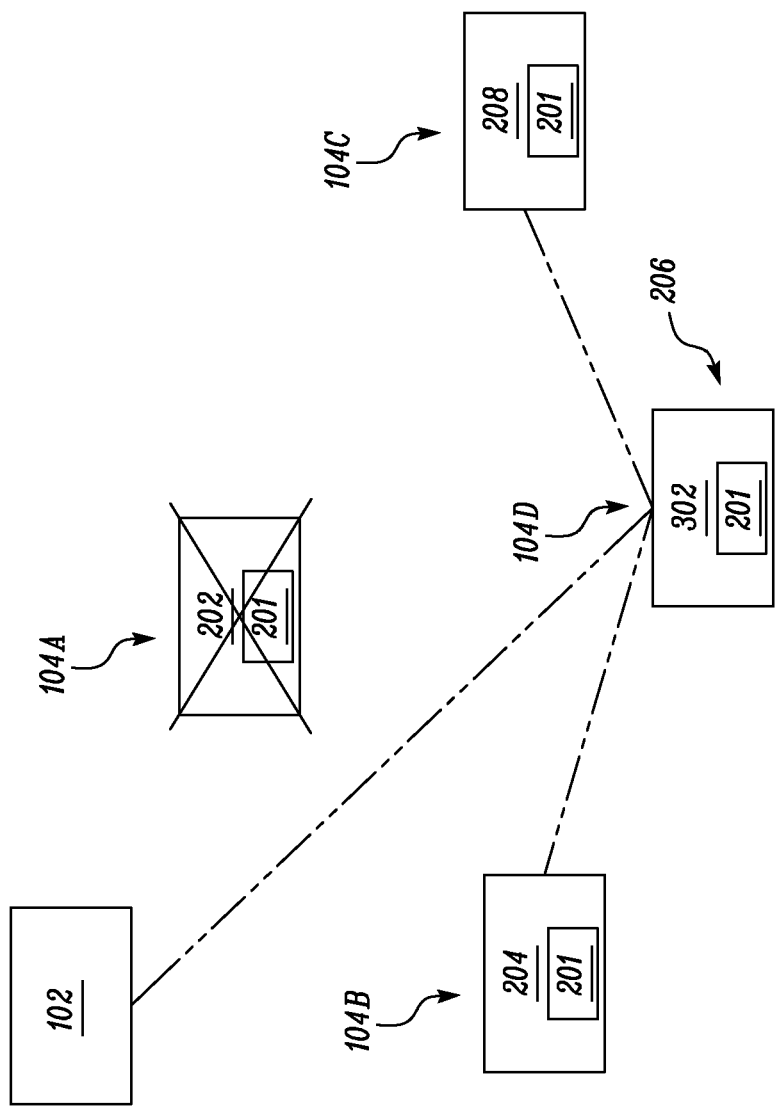

In the present disclosure, each of the nodes 104 further includes a failover module 201 (see FIGS. 2 and 3). The failover module 201 is configured to detect a failure of the designated server node. Further, based on the detection of the failure of the designated server node, the failover module 201 is configured to designate a new designated server node from among the designated HMI client nodes. The designation of the new server node will be explained in connection with FIGS. 2 and 3. The failover module 201 may also be configured to detect a failure of the relay node (for example, node 104C). Further, based on the detection of the failure of the relay node (104C), the failover module 201 may be configured to establish an alternate connection with the designated server node.

The failover module 201 may detect the failure of the designated server node and/or the relay node in a variety of ways. In one embodiment, the given designated HMI client node may monitor ports at which the connection between the HMI client and the designated server node and/or the relay node is established. On detection of a closed connection, the failover module 201 may determine that the respective designated server node or the relay node has failed. The closed connection may be indicative of a hardware or software failure of the respective node.

In one embodiment, known protocols, such as, for example, a gossip protocol may be used detect the failure of the designated server node or the relay node. The gossip protocol may be used to maintain relaxed consistency requirements amongst the plurality of nodes. One of ordinary skill in the art will appreciate that in order to detect the failure, each of the plurality of nodes 104 may send out a test message to the other nodes 104. The test messages may propagate through the system, node by node, thereby enabling each of the nodes to build a global map from limited local interactions with the other nodes. The methods of failure detection described herein do not limit the scope of the present disclosure, and other methods to detect failure of the designated server node or the relay node may be employed.

Further, in one embodiment, when the failure of the relay node is detected, the given designated HMI client node may close all the network connections and reject any incoming connection request from the other designated HMI client nodes until the alternate connection is established with the relay node. Similarly, in case of the detection of the failure of the designated server node, the given designated HMI client node may close all the network connections and reject the incoming connection requests until the new server node is designated.

An exemplary method of designating the new server node will now be described in detail with reference to FIGS. 2 and 3. FIGS. 2 and 3 are block diagrams of an exemplary system setup, according to one embodiment of the present disclosure. The dashed lines in the FIGS. 2 and 3 are indicative of active communication links established through the respective wired connections. As described earlier, the designated server node 202 is configured to communicate with the PLC 102. The turbine operational information from the PLC 102 may be transmitted to the designated HMI client nodes 204, 206, 208 via the designated server node 202. In the illustrated embodiment, three designated HMI client nodes 204, 206, 208 are connected either directly or indirectly to the designated server node 202. More particularly, the node 204 serves as the relay node for conveying the turbine operational data to the node 206.

In one exemplary situation, the designated server node 202 may fail. This failure may be due to various reasons, such as, for example, broken node hardware, a broken network, software bugs, or inadequate hardware resources. This failure is depicted by a cross mark on the respective node 202 in FIG. 3. Moreover, the failover module 201 in the nodes 204, 208 may detect the closed connection with the node 202, indicating that the designated server node 202 has failed. As a result, the node 204 may reject the incoming client request from the node 206.

Based on the failure of the designated server node 202, the new server node 302 may be designated from among the remaining nodes 204, 206, 208. The failover module 201 present in each of the nodes 204, 206, 208 may be configured maintain a list including one or more of, IP addresses, MAC IDs, computer names of each of the nodes 204, 206, 208 and the PLC 102. In one embodiment, the failover module 201 may scan the list in a cyclic manner and attempt to establish the connection with the next available node 204, 206, 208 or the connection with the PLC 102. A person of ordinary skill in the art will appreciate that selection of the next node for connection may alternatively be done by other known methods taking factors such as network traffic, system and resource availability, connection timing and the like. Moreover, other algorithms may be used for scanning the list in order to establish the connection. Also, the list may maintain the end points of the connection, without specifying the route or path for establishing the connection.

As shown in FIG. 3 the node 302 may be designated as the new server node. Further, the nodes 204, 208 may establish the connection with the new designated server node 302. It should be noted that on adding new nodes to the system, the relevant entries in the list may need to be updated either manually or automatically.

Although the FIGS. 2 and 3 have been explained in relation to downlink communication of the turbine operational data, the present disclosure may also be utilized for uplink communication from the designated HMI client nodes 204, 206, 208 to the PLC 102 through the designated server node 202. Further, the network switches 106 have been omitted in the FIGS. 2 and 3 for the purpose of clarity. One of ordinary skill in the art will appreciate that on the failure of any of the relay nodes 204, the respective designated HMI client nodes 206 may establish the alternate connection with the designated server node 202 based on the scanning of the list in a manner similar to that explained above.

Figure 4:
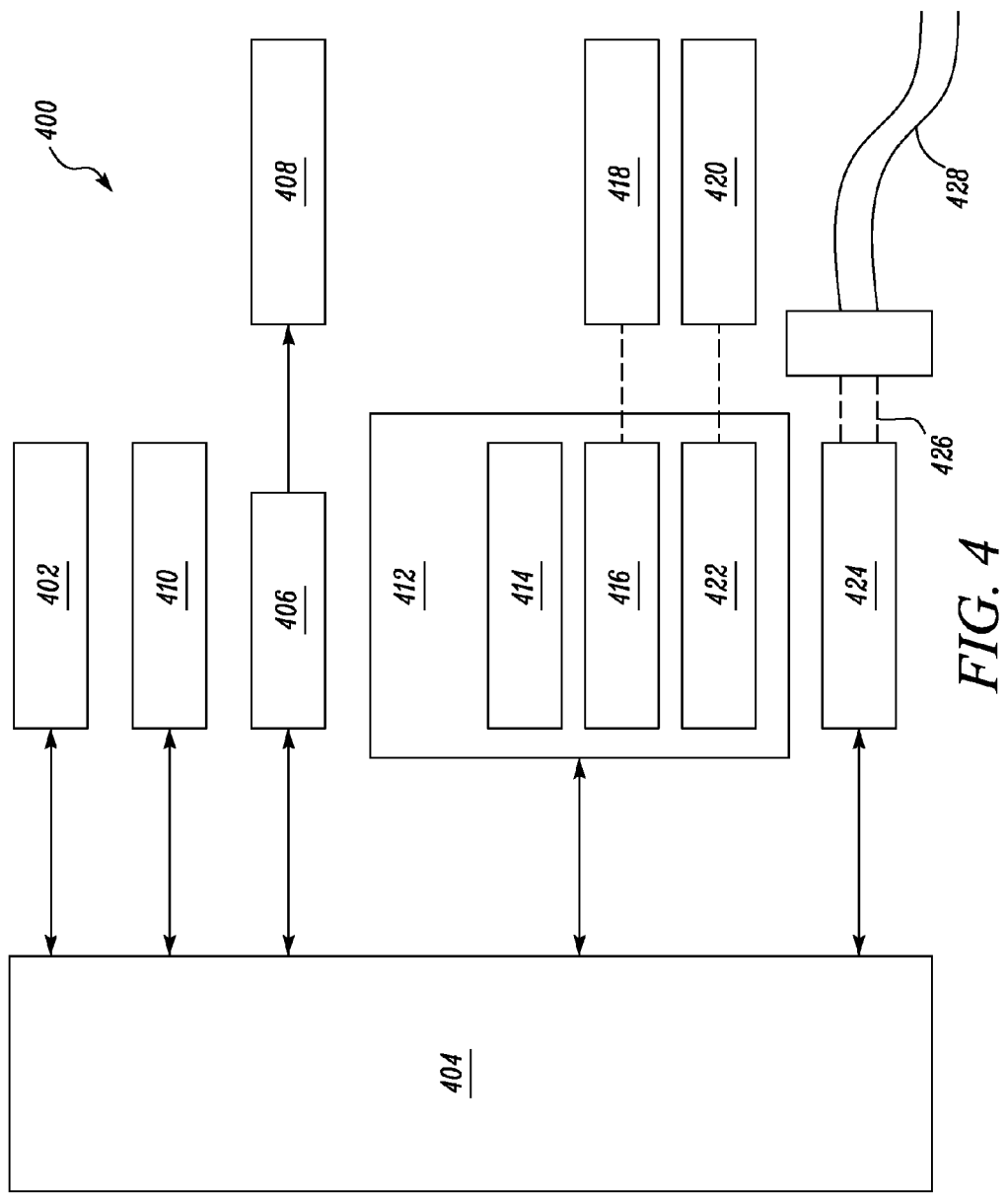
FIG. 4 is a block diagram of an exemplary computer system for implementing the present disclosure.

In fact, in accordance with an embodiment of the present disclosure, the present disclosure is directed towards one or more nodes 104 capable of carrying out the functionality described herein. An example of the node 104 includes a computer system 400, which is shown in FIG. 4.

The computer system 400 includes at least one processor, such as a processor 402. The processor 402 is connected to a communication infrastructure 404, for example, a communications bus, a cross over bar, a network, and the like. Various software embodiments are described in terms of this exemplary computer system 400. After reading this description, it will become apparent to a person skilled in the relevant art(s) how to implement the present disclosure using other computer systems and/or architectures.

The computer system 400 includes a display interface 406 that forwards graphics, text, and other data from the communication infrastructure 404 (or from a frame buffer which is not shown in FIG. 4) for display on a display unit 408.

The computer system 400 further includes a main memory 410, such as random access memory (RAM), and may also include a secondary memory 412. The secondary memory 412 may further include, for example, a hard disk drive 414 and/or a removable storage drive 416, representing a floppy disk drive, a magnetic tape drive, an optical disk drive, etc.

The removable storage drive 416 reads from and/or writes to a removable storage unit 418 in a well known manner. The removable storage unit 418 may represent a floppy disk, magnetic tape or an optical disk, and may be read by and written to by the removable storage drive 416. As will be appreciated, the removable storage unit 418 includes a computer usable storage medium having stored therein, computer software and/or data.

In accordance with various embodiments of the present disclosure, the secondary memory 412 may include other similar devices for allowing computer programs or other instructions to be loaded into the computer system 400. Such devices may include, for example, a removable storage unit 420, and an interface 422. Examples of such may include a program cartridge and cartridge interface (such as that found in video game devices), a removable memory chip (such as an erasable programmable read only memory (EPROM), or programmable read only memory (PROM)) and associated socket, and the other removable storage units 420 and the interfaces 422, which allow software and data to be transferred from the removable storage unit 420 to the computer system 400.

The computer system 400 may further include a communication interface 424. The communication interface 424 allows software and data to be transferred between the computer system 400 and external devices. Examples of the communication interface 424 include, but may not be limited to a modem, a network interface (such as an Ethernet card), a communications port, a Personal Computer Memory Card International Association (PCMCIA) slot and card, and the like. Software and data transferred via the communication interface 424 are in the form of a plurality of signals, hereinafter referred to as signals 426, which may be electronic, electromagnetic, optical or other signals capable of being received by the communication interface 424. The signals 426 are provided to the communication interface 424 via a communication path (e.g., channel) 428. A communication path 428 carries the signals 426 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 416, a hard disk installed in hard disk drive 414, the signals 426, and the like. These computer program products provide software to the computer system 400. The present disclosure is directed to such computer program products.

Computer programs (also referred to as computer control logic) are stored in the main memory 410 and/or the secondary memory 412. Computer programs may also be received via the communication infrastructure 404. Such computer programs, when executed, enable the computer system 400 to perform the features of the present disclosure, as discussed herein. In particular, the computer programs, when executed, enable the processor 402 to perform the features of the present disclosure. Accordingly, such computer programs represent controllers of the computer system 400.

In accordance with an embodiment of the disclosure, where the disclosure is implemented using a software, the software may be stored in a computer program product and loaded into the computer system 400 using the removable storage drive 416, the hard disk drive 414 or the communication interface 424. The control logic (software), when executed by the processor 402, causes the processor 402 to perform the functions of the present disclosure as described herein.

In another embodiment, the present disclosure is implemented primarily in hardware using, for example, hardware components such as application specific integrated circuits (ASIC). Implementation of the hardware state machine so as to perform the functions described herein will be apparent to persons skilled in the relevant art(s).

In yet another embodiment, the present disclosure is implemented using a combination of both the hardware and the software.

INDUSTRIAL APPLICABILITY

The present disclosure relates to a client server architecture used to transmit and communicate the turbine operational data from a remote site to multiple users. In known systems, in order to avoid PLC stress, only one client device may connect to a PLC at a time. However, multiple client devices may require access to the PLC at the same time. Known solutions make use of a single server for collecting data from the PLC and sharing the data to all other client devices. However, this server may serve as a critical weakness point in the system.

The present disclosure relates to the system which may support multiple server redundancy. More specifically, on the failure of the designated server node 202, the new designated server node 302 may be selected from among the remaining designated HMI client nodes 204, 206, 208. Further, the turbine operational data is not stored at any of the plurality of nodes 104, thus allowing data consistency to be maintained in the system. The system reliability may be further improved due to the multiple physical or wired connections. In order to implement a real redundancy system, in the present disclosure, a separate wired cable may be provided for each redundant connection device (i.e. the network switch 106 and/or any of the plurality of nodes 104). If a network cable, the network switch 106 or any of the plurality of nodes 104 fail, the system may easily bypass the failed device and establish the alternate connection through another network cable.

Figure 5:
FIG. 5 is a flowchart of a method for server redundancy.

FIG. 5 depicts a flowchart of a method for server redundancy. Initially, each of the plurality of nodes 104 may attempt to establish the connection with the next node 104 or the PLC 102, based on the list. The said node 104 may then check if the given next node 104 or the PLC 102 is available for establishing the connection. If the node or the PLC 102 is available for the connection, the connection may be established. Otherwise, the said node 104 may attempt to establish the connection with another of the nodes 104 or the PLC 102 as present in the list. At step 502, the single server node 202 may be designated from among the plurality of nodes 104. The designation of the server node 202 may be based on a priority or order of the connection of the node 202 with the PLC 102. At step 504, the remaining nodes 204, 206, 208 are designated as the designated HMI client nodes 204, 206, 208.

Downlink and uplink communication of the turbine operational data and the control information may take place from the PLC 102, through the designated server node 202, to the designated HMI client nodes 204, 206, 208 and vice-versa. At step 506, the failover module 201 in each of the designated HMI client nodes 204, 206, 208 may monitor the connections for detecting the failure of the designated server node 102. Further, at step 508, the failover module 201 is configured to check if the designated server node 202 has failed. For example, the node 204 may check if the designated server node 202 is open for listening to the incoming client request from the node 204. If the designated server node 202 is detected as being open to the listening, then the node 204 may receive the turbine operational data from the designated server node 202 or transmit the control information to the designated server node 202. Further, the node 204 may also be open to sharing the turbine operational data with the node 206.

However, if the designated server node 202 is detected as failed, then at step 510, the new server node 302 may designated from among the remaining designated HMI client nodes 204, 206, 208. In one example, the failure of the designated server node 202 may be detected as failed based on the closed connection determined by the node 204 with the node 202. On the detection of the failure of the designated server node 202, the node 204 may close connection with the node 202 and also reject the incoming client request from node 206. The selection of the new server node 302 may be made based on the designation of that node as the new server node 302 which is first to establish the connection with the PLC 102.

In one embodiment, the same procedure described above may also be utilized for detecting the failure of the relay node 204 in the system. On detection of the failure of the relay node 204, the node 206 may attempt to establish the alternate connection with the designated server node 202 either directly or through any of the other designated HMI client nodes 208, based on the list. The present disclosure may be utilized in any industrial environment without any limitation. Moreover, the system may be expanded as per the system requirements.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system comprising:
    a plurality of nodes, wherein one of the plurality of nodes is designated as a server node, and the others of the plurality of nodes are designated as Human Machine Interface (HMI) client nodes; and
    wherein the designated server node comprises a network interface configured to communicate with a Programmable Logic Controller (PLC) either directly or through a network switch;
    wherein the PLC is connected to a turbine, the PLC comprising at least one processor and a memory in communication with the at least one processor, the memory storing a plurality of processing instructions for directing the at least one processor to transmit turbine operational data to the designated server node and receive control information from the designated server node;
    wherein each of the designated HMI client nodes is capable of serving as a relay node for communicating the turbine operational data between the designated server node and one or more of the designated HMI client nodes, each of the designated HMI client nodes comprise:
        a network interface configured to communicate with the designated server node through one or more of a network switch, and another designated HMI client node; and
        a failover module configured to detect a failure of the designated server node and designate a new server node from among the designated HMI client nodes based on detecting the failure of the designated server node.

2. The system of claim 1 further comprising at least two network switches, wherein the PLC is connected to the plurality of nodes through the at least two network switches.

3. The system of claim 1, wherein the plurality of nodes and the PLC are coupled by wired connections.

4. The system of claim 1, wherein the failover module is further configured to:
    detect a failure of the relay node; and
    establish an alternate connection with the designated server node based on detecting the failure of the relay node.

5. The system of claim 4, wherein the failover module is further configured to maintain a list comprising one or more of IP addresses, MAC IDs, and computer names of each of the plurality of nodes and the PLC to establish the alternate connection.

6. The system of claim 1, wherein the plurality of nodes are located remotely.

7. A method comprising:
    designating, from a plurality of nodes communicably coupled to each other and a Programmable Logic Controller (PLC), a single node as a server node, the designated server node configured to communicate with the PLC either directly, or through a network switch;
    designating remaining ones of the plurality of nodes as Human Machine Interface (HMI) client nodes, wherein the designated HMI client nodes are communicably coupled to the designated server node through a network switch;
    detecting a failure of the designated server node;
    designating a new server node from among the designated HMI client nodes based on detecting the failure of the designated server node;
    transmitting turbine operational data to the designated server node; and
        receiving control information for a turbine from the designated server node, wherein each of the designated HMI client nodes is capable of serving as a relay node for communicating the turbine operational data between the designated server node and one or more of the designated HMI client nodes.

8. The method of claim 7 further comprising:
    detecting a failure of the relay node; and
    establishing an alternate connection with the designated server node based on detecting the failure of the relay node.

9. The method of claim 8, wherein establishing the alternate connection further comprises maintaining a list comprising one or more of IP addresses, MAC IDs, and computer names of each of the plurality of nodes and the PLC.

10. A system comprising:
    at least two network switches connected to a programmable logic controller (PLC) through wired connections; and
    a plurality of nodes connected to one of the at least two network switches;
    wherein one of the plurality of nodes is designated as a server node, wherein the designated server node is configured to communicate with the PLC through the one of the at least two network switches;
    wherein the PLC comprises at least one processor and a memory in communication with the at least one processor, the memory storing a plurality of processing instructions for directing the at least one processor to:
        transmit turbine operational data to the designated server node; and receive control information from the designated server node wherein remaining ones of the plurality of nodes are designated as human machine interface (HMI) client nodes, the designated HMI client nodes configured to communicate with the PLC through the designated server node;

wherein each of the designated HMI client nodes is capable of serving as a relay node for communicating the turbine operational data between the designated server node and one or more of the designated HMI client nodes;

wherein each of the designated HMI client nodes comprises a failover module configured to:

detect a failure of the designated server node; and designate a new server node from among the designated HMI client nodes based on detecting the failure of the designated server node.

11. The system of claim 10, wherein the failover module is further configured to:

detect a failure of the relay node; and establish an alternate connection with the designated server node based on detecting the failure of the relay node.

12. The system of claim 11, wherein the failover module is further configured to maintain a list comprising one or more of IP addresses, MAC IDs, and computer names of each of the plurality of nodes and the PLC to establish the alternate connection.

* * * * *